United States Patent [19]
Uchida

[11] Patent Number: 4,742,136
[45] Date of Patent: May 3, 1988

[54] OPTICAL PLASTIC MATERIAL

[75] Inventor: Kingo Uchida, Ikeda, Japan

[73] Assignee: Agency of Industrial Science & Technology, Tokyo, Japan

[21] Appl. No.: 43,389

[22] Filed: Apr. 28, 1987

[30] Foreign Application Priority Data

Dec. 6, 1986 [JP] Japan .................. 61-291296

[51] Int. Cl.$^4$ .......................................... C08F 30/08
[52] U.S. Cl. ................... 526/279; 523/106; 523/107
[58] Field of Search ............... 526/279; 523/106, 107

[56] References Cited

U.S. PATENT DOCUMENTS

| 4,314,068 | 2/1982 | Novicky | 556/440 |
| 4,359,271 | 12/1985 | Doin et al. | 524/89 |
| 4,463,149 | 7/1984 | Ellis | 526/279 |

FOREIGN PATENT DOCUMENTS

| 59-53509 | 3/1984 | Japan | 526/279 |
| 86/01219 | 2/1986 | PCT Int'l Appl. | 526/279 |

OTHER PUBLICATIONS

JP 158882-(84-109877/18) Toyo.

Primary Examiner—Joseph L. Schofer
Assistant Examiner—N. Sarofim
Attorney, Agent, or Firm—Armstrong, Nikaido, Marmelstein & Kubovcik

[57] ABSTRACT

An optical plastic material which is a three-dimensional polymer comprising a structural unit of the following formula (1), (2), (3) or (4) is disclosed:

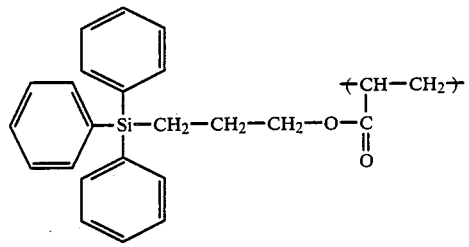

(1)

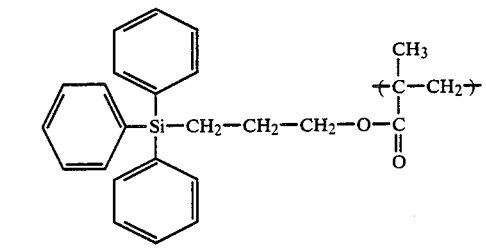

(2)

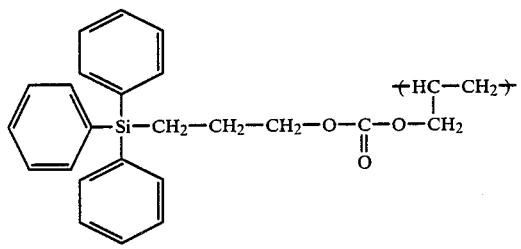

(3)

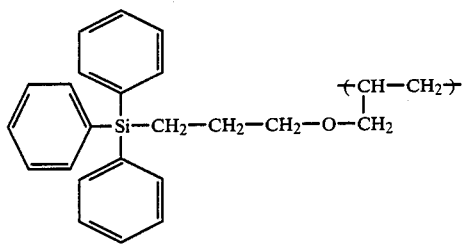

(4)

7 Claims, 1 Drawing Sheet

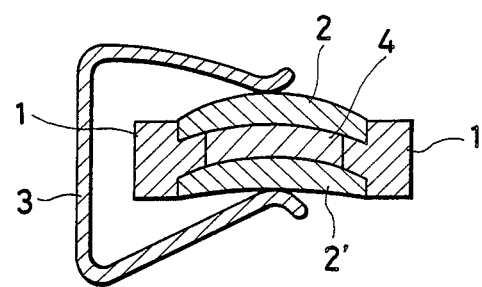

OPTICAL PLASTIC MATERIAL

BACKGROUND OF THE INVENTION

The present invention relates to optical plastic materials comprising an unsaturated compound having a triphenylsilyl group as a comonomer component.

As the optical plastic materials, polymethyl methacrylate, polycarbonates, diethylene glycol bisallyl carbonate (CR-39), etc. have been proposed.

However, poly(methyl methacrylate) and polycarbonates cannot be cut or polished easily, since they are thermoplastic linear polymers.

Further, the CR-39 resin has defects that its refractive index is as low as 1.50 so that the thicknesses of the center and the edge of the lens are inevitably high unfavorably when lens was made of CR-39 resins.

Under these circumstances, optical plastic materials having a three-dimensional reticulate structure and a high refractive index are required and various techniques have been proposed such as those described in Japanese patent application Kokai publication Nos. 60-231711, 60-231712, 60-231713, 60-197711 and 60-28413.

However, the optical plastic materials disclosed in the above-mentioned five patents often have a poor weather resistance and particularly when a halogen atom or the like is introduced therein in order to increase the refractive index, the materials are colored yellow by the exposure over a long period of time.

On the other hand, polymers containing silicon have generally excellent thermal resistance and weather resistance and a high transparency. After investigations made for the purpose of using the silicon-containing polymer as an optical plastic material, the inventors produced compounds containing silicon and a polymerizable group by introducing an aromatic ring therein. The inventors have found that these monomers are copolymerizable with general-purpose monomers such as CR-39 monomer, diallyl phthalate and diallyl terephthalate to form copolymers having a high refractive indices. The present invention has been completed on the basis of this finding.

SUMMARY OF THE INVENTION

A first object of the present invention is to provide a colorless, transparent, optical plastic material having a high refractive index.

A second object of the present invention is to provide an optical plastic material having an excellent weather resistance.

A third object of the present invention is to provide an optical plastic material preferably usable as a material for lenses and prisms.

BRIEF DESCRIPTION OF THE DRAWINGS

The attached FIGURE of drawings is a longitudinal section of a mold used in the production of a lens from the plastic material of the present invention.

DESCRIPTION OF THE PREFERRED EMBODIMENTS

The optical palstic materials of the present invention are three-dimensional polymers having structural units of the following formula (1), (2), (3) or (4):

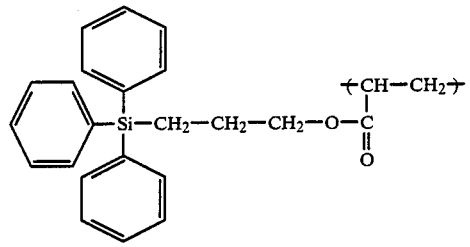
(1)

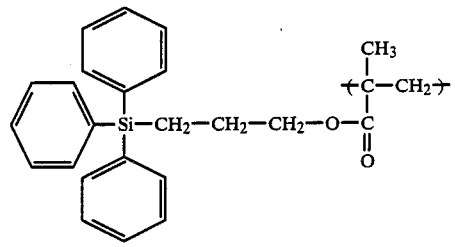
(2)

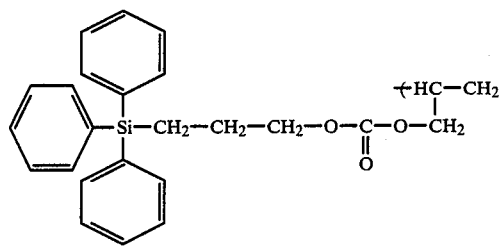
(3)

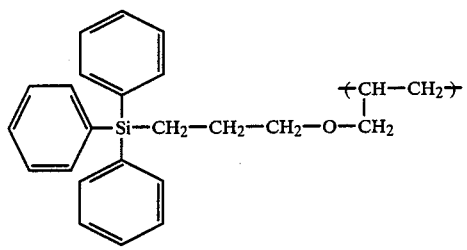
(4)

The three-dimensional polymers are colorless and transparent and have a refractive index of 1.57 to 1.61, an Abbe number of 27 to 36 and a pencil hardness of H and 5H.

The three-dimensional polymers are produced by heating an unsaturated compound having a triphenylsilyl group of the following general formula (5):

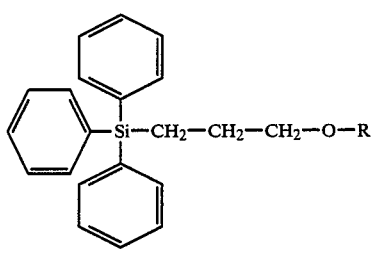
(5)

wherein R represents an acryloyl, methacryloyl, allyloxycarbonyl or allyl group, at 30° to 120° C. in the presence of a radical polymerization initiator.

The structures of the unsaturated compounds having a triphenylsilyl group according to the present invention are as follows:

(1) 3-acryloyloxypropyltriphenylsilane: (G-1)

(2) 3-methacryloyloxypropyltriphenylsilane: (G-2)

(3) 3-allyloxycarbonyloxypropyltriphenylsilane: (G-3)

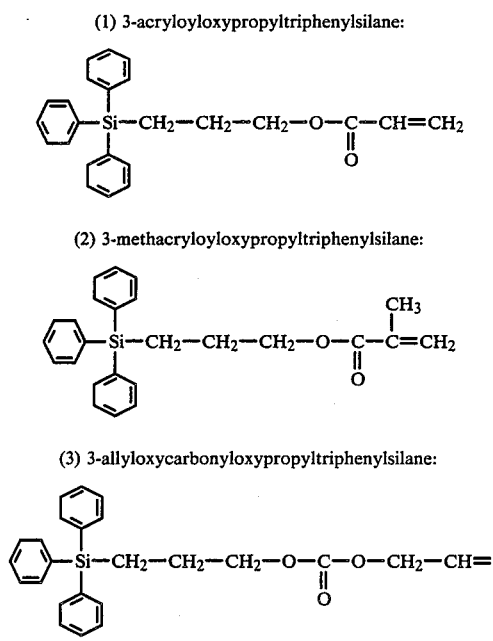

and (4) 3-allyloxypropyltriphenylsilane: (G-4)

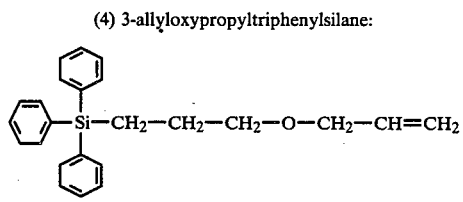

The unsaturated compounds having a triphenylsilyl group can be prepared according to the reaction formulae shown below:

Preparation process 1

The above-mentioned compounds (G-1), (G-2) and (G-3) are prepared by hydrolyzing an adduct (C) of commercially available triphenylsilane (A) and allyl acetate (B) with an alkali to obtain 3-hydroxypropyltriphenylsilane (D) and reacting this compound (D) with acryloyl chloride (E), methacryloyl chloride (E-2) or allyl chloroformate (E-3) in the presence of a dehydrochlorinating agent such as pyridine or triethylamine.

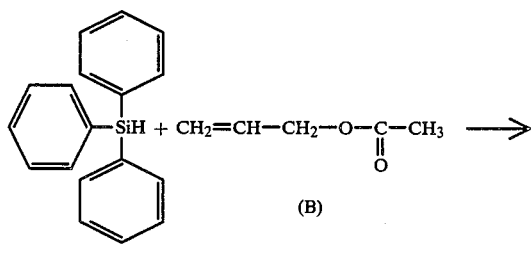

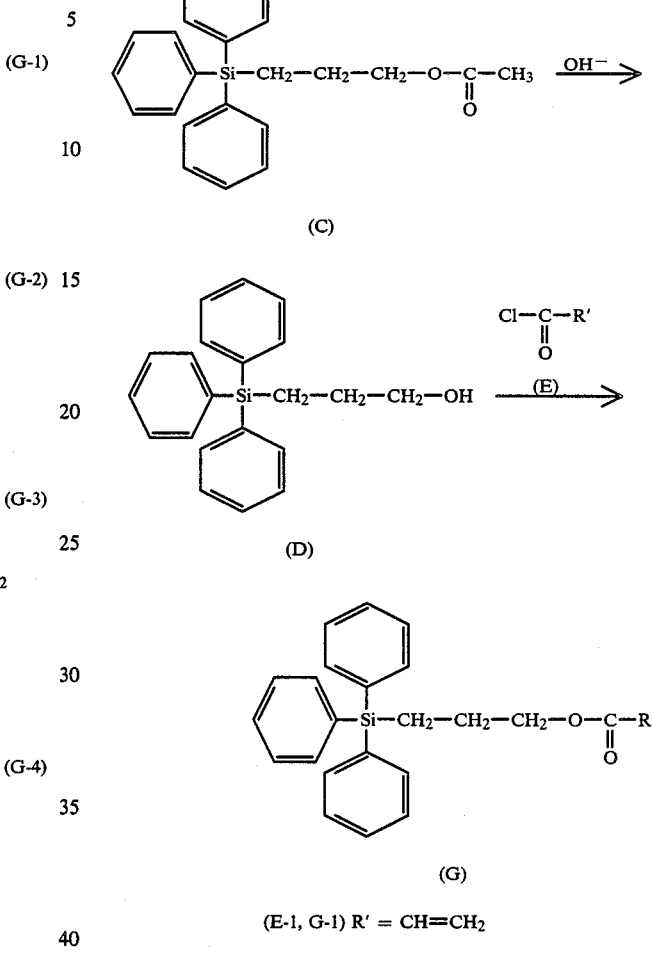

(E-1, G-1) R′ = CH=CH₂

(E-2, G-2) R′ = C=CH₂
              |
              CH₃

(E-3, G-3) R′ = O—CH₂—CH=CH₂

Preparation process 2

The above-mentioned compound (G-4) is prepared by adding triphenylsilane (A) to diallyl ether (F):

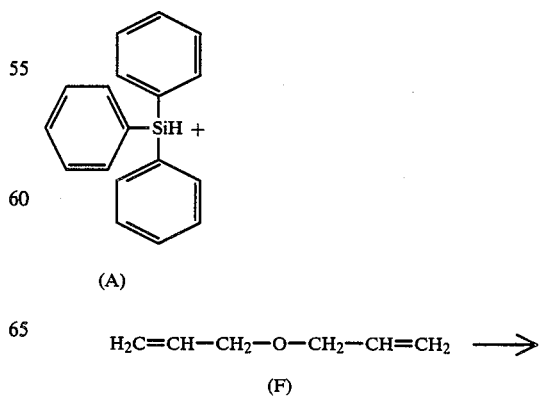

-continued

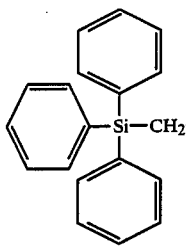

(G-4)

The unsaturated compounds having a triphenylsilyl group, (G-1) to (G-4), prepared as above are in the form of a colorless, transparent liquid or a solid having a low melting point and they have advantages that they can be easily mixed with a comonomer and that the polymerization of them can be initiated at a low temperature so that the finished polymer product is free from distortion.

The optical plastic material of the present invention is produced by the homopolymerization of the silicon-containing unsaturated compound (G) prepared as described above or preferably by the copolymerization thereof with another copolymerizable compound.

The polymerization is conducted in the presence of an ordinary radical polymerization initiator such as benzoyl peroxide, 2,4-dichlorobenzoyl peroxide, di-t-butyl peroxide or diisopropyl peroxydicarbonate.

The copolymer may be any compound which is homogeneously miscible with the compound (G) and copolymerizable with the same. Further, it is desirable that the polymerizability of the comonomer is substantially equal to that of the compound (G).

Examples of the comonomers include methacrylic esters such as methyl methacrylate, benzyl methacrylate, phenyl methacrylate, bromophenyl methacrylate, ethylene glycol dimethacrylate, cyclohexyl methacrylate, tris(2-methacryloxyethyl) isocyanurate, acrylic esters such as phenyl acrylate, bromophenyl acrylate, benzyl acrylate and tris(2-acryloxyethyl) isocyanurate; allyl esters such as diallyl phthalate, diallyl isophthalate, diallyl terephthalate, diethylene glycol bisallyl carbonate, triallyl cyanurate and triallyl isocyanurate; and aromatic olefins such as styrene, chlorostyrene and bromostyrene.

These comonomers may be used either alone or as a combination of two or more of them.

In case of the copolymerization, at least one of the comonomers must be a polyfunctional comonomer having two or more copolymerizable groups in the molecule.

The kind and the amount of the comonomer are selected in due consideration of requirements that the refractive index of the copolymer is not seriously reduced and the transparency is not lowered by the comonomer and that other necessary physical properties are improved.

From the viewpoint of the inhibition of the reduction of the refractive index, such a comonomer that its homopolymer has a refractive index of at least 1.50 is desirable.

To prepare a hard, three-dimensional, crosslinked product, the maximum amount of the compound (G) in the copolymer varies depending on the form of the compound (G) and the activity of the polymerizable group R, since the compound (G) is a monofunctional one. The maximum amount is preferably about 5 to 70% for (G - 1), 5 to 80% for (G-2), 5 to 40% for (G-3) and 5 to 40% for (G-4).

When the amount of the compound (G) is less than 5%, the effects of the silicon compound to increase the refractive index and to improve the weather resistance and thermal resistance cannot be expected.

The polymerization is conducted by pouring a polymerization solution prepared by adding a radical polymerization initiator to the compound (G) or a liquid mixture of the compound (G) and the comonomer in a glass polymerization vessel (glass mold) and gradually elevating the temperature from 30° to 40° C. to a higher temperature. In this step, a rapid temperature elevation must be avoided, since the produced polymer is distorted thereby or a popcorn polymerization occurs by the excessively rapid temperature elevation. The maximum polymerization temperature is about 120° C.

When a glass mold to be used has previously polished faces and inner walls, a polymer product having a desired shape having the faces corresponding to the polished faces can be obtained.

The obtained polymer is a three-dimensional, crosslinked product having a structural unit of the following formula (1), (2), (3) or (4) and, therefore, it can be easily subjected to mechanical processes such as cutting and polishing.

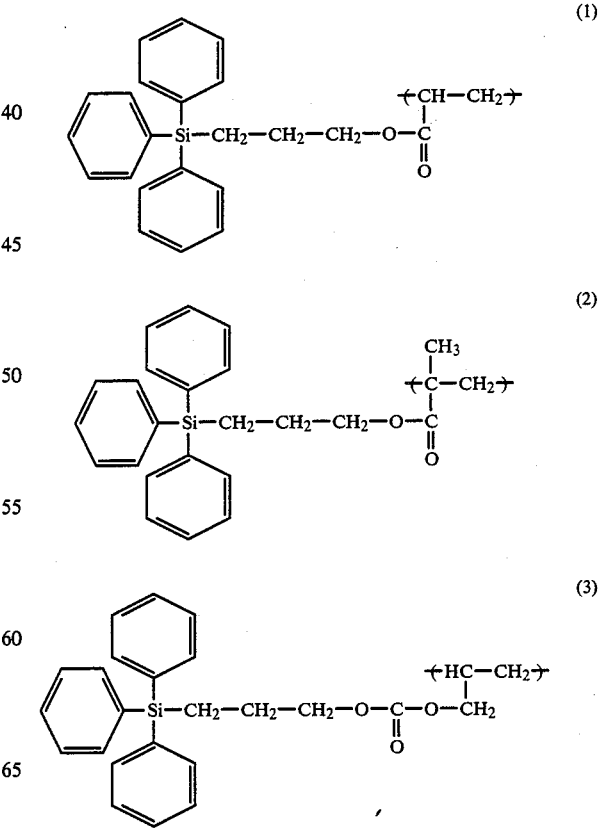

-continued

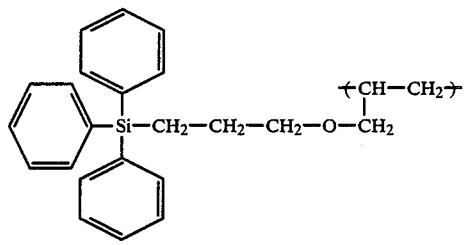
(4)

As described above, the optical plastic material of the present invention can be produced easily by homopolymerizing the unsaturated compound having a triphenylsilyl group or copolymerizing it with an acrylic ester, methacrylic ester, allyl ester or aromatic olefin.

The obtained polymers are colorless and transparent and have a high refractive index and an excellent weather resistance. They are suitable for use as optical plastic materials.

The following examples will further illustrate the present invention.

EXAMPLE 1

Preparation of 3-acryloyloxypropyltriphenylsilane (G-1)

0.5 ml of a 0.1 N solution of chloroplatinic acid as the catalyst in 2-propanol was added to an excess amount [58.1 g (581 mmol)] of allyl acetate (B). 40 g (15.4 mmol) of triphenylsilane (A) was added thereto and the mixture was stirred at room temperature for 3 h. After confirming the completion of the reaction according to the disappearance of an absorption due to SiH at 2100 cm$^{-1}$ in the I.R. absorption spectrum, excess (B) was distilled off under reduced pressure. The residue was purified according to column chromatography to obtain 51.1 g (14.2 mmol) of 3-acetoxypropyltriphenylsilane (C) (yield: 92.2%).

32.9 g (91.4 mmol) of compound (C) was added to a 1 N solution of sodium carbonate in ethanol and the mixture was heated at 70° to 80° C. for 3 h to conduct the hydrolysis. 27.7 g (87.1 mmol) of 3-hydroxypropyltriphenylsilane (D) was thus obtained (yield: 95.4%). 250 ml of dry benzene was placed in a flask after replacing air in the flask with a dry inert gas (argon). 5.0 g (15.7 mmol) of compound (D) and 1.9 g of triethylamine were dissolved therein. 50 ml of a solution of 1.6 g (17.7 mmol) of acryloyl chloride in benzene was added slowly thereto. After the completion of the addition, the mixture was stirred at room temperature for 6 h. The reaction solution was washed with a 0.5 N hydrochloric acid, water, a 1 N sodium carbonate solution and water successively and then dried over magnesium sulfate. Benzene was distilled off and the residue was purified according to column chromatography (silica gel/benzene) to obtain 5.1 g (13.7 mmol) of 3-acryloyloxypropyltriphenylsilane in the form of white crystals (yield: 87.3%).

EXAMPLE 2

Preparation of compounds (G-2) and (G-3)

Compounds (G-2) and (G-3) were prepared in the same manner as in Example 1. The preparation conditions and the results are shown in Table 1. In the preparation of compound (G-3), pyridine was used as the dehydrochlorinating agent.

EXAMPLE 3

Preparation of 3-allyloxypropyltriphenylsilane (G-4)

0.5 ml of a 0.1 N solution of chloroplatinic acid as the catalyst in 2-propanol was added to an excess amount [18.3 g (187 mmol)] of diallyl ether (F). 16 g (62.3 mmol) of triphenylsilane (A) was added thereto and the mixture was stirred at room temperature for 3 h. After confirming the completion of the reaction according to the disappearance of an absorption due to SiH at 2100 cm$^{-1}$ in the I.R. absorption spectrum, excess (F) was distilled off under reduced pressure. The residue was purified according to column chromatography to obtain 16.5 g (50.0 mmol) of 3-allyloxypropyltriphenylsilane (G-4) (yield: 80.3%).

EXAMPLE 4

Preparation of copolymers and homopolymer 4.0 parts of benzoyl peroxide as the polymerization initiator was added to a liquid mixture of 28 parts of compound (G-1) prepared in Example 1 and 72 parts of diallyl phthalate to obtain a homogeneous mixture. The mixture was filled in a matrix composed of glass forces 2 and 2' and a gasket 11 and pressed with a push spring 3 as shown in the FIGURE. The matrix was placed in a polymerization vessel in which the temperature was controlled by programming. The heating temperature was gradually elevated from 50° C. to 100° C. to conduct the polymerization.

As a result, a colorless, transparent plastic lens 4 was obtained. The properties of the lens are shown in Table 2. Various lenses were prepared from a homopolymer of compound (G-2) and copolymer of compound (G-1), (G-2), (G-3) or (G-4) and a comonomer. The properties of the lenses are shown in Table 2. The refractive index and Abbe number were determined by means of an Abbe refractometer and the pencil hardness was determined according to JIS K 5400. The weather resistance was determined by exposing the samples to a light of a Sunshine Weathero-meter for 20 h and examining the results visually according to the following criteria:

O: no visual color change, and
Δ: slight yellowing.

COMPARATIVE EXAMPLE: 2

Triallyl cyanurate, diallyl phthalate and bis(3-methacryloyloxypropyl)diphenylsilane were each homopolymerized in the presence of benzoyl peroxide in the same manner as in Example 4 to prepare plastic lenses.

The properties of the lenses are shown in Table 2.

TABLE 1

| Compound G | Form (yield: %) | Starting compound and its amount | Dehydrochlorinating agent and its amount |
|---|---|---|---|
| (G-1) (C$_6$H$_5$)$_3$Si—CH$_2$—CH$_2$—CH$_2$—O—C(=O)—CH=CH$_2$ | white crystals m.p. 91~93° C. 5.1 g (13.7 mmol) (87.3%) | (D) 5.0 g (15.7 mmol) acryloyl chloride (E-1) 1.6 g (17.7 mmol) | triethylamine 1.9 g (18.8 mmol) |
| (G-2) (C$_6$H$_5$)$_3$Si—CH$_2$—CH$_2$—CH$_2$—O—C(=O)—C(CH$_3$)=CH$_2$ | colorless, transparent liquid 9.82 g (25.4 mmol) (90.0%) | (D) 9.0 g (28.3 mmol) methacryloyl chloride (E-2) 3.3 g (31.5 mmol) | triethylamine 3.4 g (33.7 mmol) |
| (G-3) (C$_6$H$_5$)$_3$Si—CH$_2$—CH$_2$—CH$_2$—O—C(=O)—O—CH$_2$—CH=CH$_2$ | white crystals m.p. 70~71° C. 5.45 g (13.6 mmol) (95.5%) | (D) 4.5 g (14.2 mmol) allyl chloroformate (E-3) 1.88 g (15.6 mmol) | pyridine 1.35 g (17.0 mmol) |
| (G-4) (C$_6$H$_5$)$_3$Si—CH$_2$—CH$_2$—CH$_2$—O—CH$_2$—CH=CH$_2$ | colorless, transparent liquid (80.3%) | see Example 3 | |

TABLE 2

| Compound G and its amount (parts by weight) | Comonomer and its amount (parts by weight) | | Amount of BP for 100 parts of monomer | Refractive index $n_D$ | Abbe No. $\nu$ | Pencil hardness | Weather resistance |
|---|---|---|---|---|---|---|---|
| (G-1) 17 | BMDS | 83 | 4 | 1.582 | 36 | 2 H | O |
| 28 | DAP | 72 | 4 | 1.586 | 31 | 2 H | O |
| (G-2) 100 | — | | 4 | 1.610 | 27 | 2 H | O |
| 81 | BMDS | 19 | 4 | 1.600 | 28 | 2 H | O |
| 39 | BMDS | 61 | 4 | 1.581 | 34 | 2 H | O |
| (G-3) 20 | DAP | 80 | 4 | 1.578 | 35 | 2 H | O |
| 52 | TAC | 48 | 4 | 1.586 | 35 | H | O |
| (G-4) 25 | DAP 37 | TAC 38 | 4 | 1.584 | 35 | 5 H | O |
| Comparative Example | TAC | 100 | 4 | 1.574 | 38 | 6 H | Δ |
| | DAP | 100 | 4 | 1.569 | 35 | 3 H | Δ |
| | BMDS | 100 | 4 | 1.570 | 36 | 4 H | O |

BMDS: bis(3-methacryloyloxypropyl)diphenylsilane
DAP: diallyl phthalate
TAC: triallyl cyanurate
BP: benzoyl peroxide

I claim:

(1)
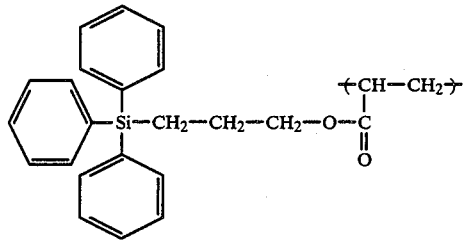

(2)
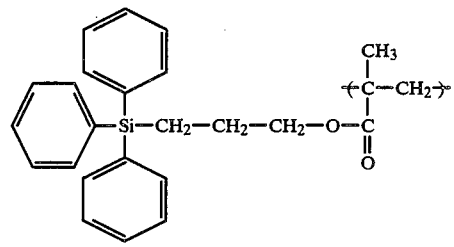

(3)
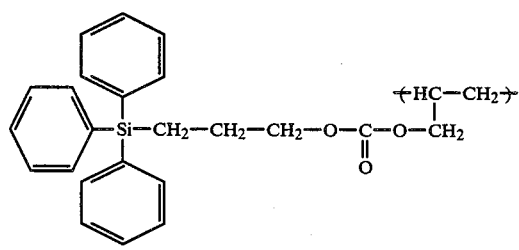

(4)

2. An optical plastic material according to claim 1, wherein said three-dimensional polymer is colorless and transparent and has a refractive index of 1.57 to 1.61 and an Abbe number of 27 to 36.

3. An optical plastic material according to claim 1, wherein said three-dimensional polymer has a pencil hardness of H to 5H.

4. An optical plastic material according to claim 1, wherein said three-dimensional polymer is prepared by heating at least an unsaturated compound having a triphenylsilyl group of the following general formula (5) at 30° to 120° C. in the presence of a radical polymerization initiator:

(5)

wherein
R represents an acryloyl, methacryloyl, allyloxycarbonyl or allyl group.

5. An optical plastic material according to claim 4, wherein said three-dimensional polymer is a homopolymer of the unsaturated compound having a triphenylsilyl group of the above general formula (5).

6. An optical plastic material according to claim 4, wherein said three-dimensional polymer is a copolymer of the unsaturated compound having a triphenylsilyl group of the above general formula (5) and comonomers.

7. An optical plastic material according to claim 6, wherein said comonomer is at least one compound selected from the group consisting of methacrylic esters, acrylic esters, allyl esters and aromatic olefins.

* * * * *